United States Patent [19]

Matsunaga et al.

[11] 4,045,388
[45] * Aug. 30, 1977

[54] RESIN COMPOSITION OF HYDROPHILIC PULLULAN, HYDROPHOBIC THERMOPLASTIC RESIN, AND PLASTICIZER

[75] Inventors: Hiroomi Matsunaga, Kobe; Kozo Tsuji, Ibaragi; Teruo Saito, Takatsuki, all of Japan

[73] Assignees: Sumitomo Chemical Company, Limited, Osaka; Hayashibara Biochemical Laboratories, Inc., Okayama, both of Japan

[*] Notice: The portion of the term of this patent subsequent to Aug. 24, 1993, has been disclaimed.

[21] Appl. No.: 552,745

[22] Filed: Feb. 25, 1975

[30] Foreign Application Priority Data

Feb. 28, 1974 Japan .................................. 49-24498
Feb. 28, 1974 Japan .................................. 49-24499

[51] Int. Cl.$^2$ ............................................... C08L 5/00
[52] U.S. Cl. ........................... 260/17.4 ST; 260/2.5 R; 260/9; 260/DIG. 43
[58] Field of Search ............. 260/17.4 ST, 9, DIG. 43

[56] References Cited

U.S. PATENT DOCUMENTS

| | | |
|---|---|---|
| 3,784,390 | 1/1974 | Hijiya et al. ............... 260/17.4 ST X |
| 3,871,892 | 3/1975 | Hijiya et al. .......................... 106/126 |
| 3,873,333 | 3/1975 | Hijiya et al. .......................... 106/130 |
| 3,888,809 | 6/1975 | Nakashio et al. .................... 260/17.4 |
| 3,976,605 | 8/1976 | Matsunaga et al. ................... 260/2.5 |

OTHER PUBLICATIONS

"Rigid Plastics", Ferrigno, p. 149, TA455 P5 F47, Reinhold Publ.

*Primary Examiner*—Edward M. Woodberry
*Attorney, Agent, or Firm*—Stevens, Davis, Miller & Mosher

[57] ABSTRACT

A novel resin composition is obtained by blending a hydrophilic pullulan with 2 to 98 wt %, based on the total resin weight, of a hydrophobic thermoplastic resin.

In case the amount of the thermoplastic resin is 2 to 50 wt %, there is obtained a resin composition consisting essentially of the pullulan which is excellent in water resistance, while in case the amount of the thermoplastic resin is 50 to 98 wt %, there is obtained a resin composition consisting essentially of the thermoplastic resin which has been improved in water and moisture absorptivity.

4 Claims, No Drawings

RESIN COMPOSITION OF HYDROPHILIC PULLULAN, HYDROPHOBIC THERMOPLASTIC RESIN, AND PLASTICIZER

This invention relates to a novel resin composition obtained by blending a pullulan type resin with a hydrophobic thermoplastic resin.

Pullulan is easily soluble in water, is non-toxic, is edible, does not liberate any harmful gas even when burned, and is spontaneously decomposed by microorganisms even when discarded as it is. Because of these properties, pullulan, unlike the conventional plastics, does not cause problems of environmental pollution derived from the abandonment thereof. Further, a thin film of pullulan is oxygen-impermeable, and hence can prevent medicines or foods from oxidation to keep them fresh. For the above reasons, pullulan is being watched with keen interest as a non-environmental pollution-causing resin that is usable in place of the conventional petrochemical products.

However, such properties as being water-soluble, water absorptive and hydrophilic, which are merits of pullulan, result conversely, in such demerits as becoming sticky with moisture and being low in water resistance. Thus, pullulan is limited in its application field.

On the other hand, hydrophobic thermoplastic resins such as polyethylenes, polypropylene, polystyrenes, polyvinyl chlorides, etc. are scarcely varied in properties due to absorption of moisture, and, taking advantage of such favorable water resistance, have been put into various such as fibers, films, molded articles, etc. However, the said resins haven been restricted in used where moisture absorptivity and water absorptivity are required.

With an aim to overcome the above-mentioned drawbacks of hydrophilic pullulan type resins and said hydrophobic thermoplastic resins, the present inventors continued extensive studies to find that when a pullulan type resin is blended with a hydrophobic thermosplastic resin, water resistance can be imparted to the pullulan type resin and water absorptivity to the thermoplastic resin. Based on this finding, the inventors have accomplished the present invention.

An object of the present invention is to provide a novel resin composition comprising a pullulan type resin and thermosplastic resin.

Another object of the invention is to provide a novel resin composition consisting essentially of pullulan which is excellent in water resistance.

A further object of the invention is to provide a novel resin composition consisting essentially of a thermoplastic resin which has been improved in water absorptivity and moisture absorptivity.

Other objects and advantages of the invention will become apparent from the following explanation.

The pullulan referrred to in the present invention is a high molecular weight linear polymer, in which units of maltotriose, a trimer of glucose, have repeatedly bonded through an α-1,6 linkage, which is a linkage different from said trimer, and has the following molecular structure:

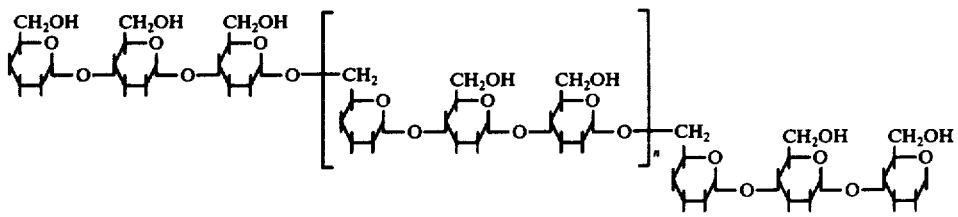

wherein $n$ is an integer of 20 to 10,000 showing the polymerization degree.

It is well known that the pullulan is easily soluble in cold water, but when modified by etherification, esterifications or graft-copolymerizations with a vinyl compound, the pullulan can be varied in water solublitity depending on the modification degree. When the thus modified pullulan is blended with a hydrophobic thermoplastic resin, there is also observed such phenomenon that it is effectively improved in properties like in the case of the pullulan itself, though more or less difference is seen in degree of improvement. Accordingly, the pullulan type resin referred to in the present invention is defined to include pullulan, and pullulan resins which have partly been modified by etherification, esterification or graft-copolymerization.

That is, when the pullulan type resin is blended with 2 to 50 wt %, based on the total resin weight, of the said thermoplastic resin, it is possible to obtan a pullulan type resin composition which is difficulty swellable with water and excellent in water resistance. If the amount of the thermoplastic resin blended is less than 2 wt %, the composition is scarcely enhanced in water resistance. On the other hand, when the pullulan type resin is blended with 50 to 98 wt %, based on the total resin weight, of the said thermoplastic resin it is possible to obtain a thermoplastic resin composition which has been improved in water and moisture absorptivity. If the amount of the thermoplastic resin blended is more than 98 wt %, the composition is scarcely improved in water and moisture absorptivity.

The procedure for blending the pullulan type resin with hydrophobic thermoplastic resin is not paricularly regulated, but may be carried out in, for example, the following manner:

A hydrophobic thermoplastic resin powder is added to a pullulan type resin containing 1 to 50 wt % of water or a plasticizer such as glycerin, ethylene glycol, propylene glycol, butylene glycol, dimethyl sulfoxide or dimethyl formamide. The resulting mixture, when hardness or surface roughness is requied for the final product, is incorporated with a proper amount of powders of one of two or more of water-insoluble inorganic salts such as calcium carbonate, calcium sulfate, magnesium carbonate, titanium oxide and clay, or of metal oxides, and is then melted and kneaded by means of an extruder having a plasticizing screw, whereby a novel resin composition pellet improved in properties can be obtained.

The thus obtained pellet is subjected to compression, injection, extrusion or the like molding process to obtain a desired molded article. Since the molded article itself has not been colored, it may be colored to a desired color. In case a colored molded article is desired to be obtained, the composition may be incorporated with a pigment. In addition, the composition may be incorporated with any of antioxidants, ultraviolet absorbers, antiseptics, etc.

If necessary, the molded article obtained in the above-mentioned manner may be subjected to cold-stretching, hot-stretching, heat treatment or the like after-treatment applied to ordinary moled polymers, thereby enhancing the molded article in physical properties such as heat resistance, strength, etc.

As mentioned above, the present invention is concerned with a novel resin composition improved in properties which is obtained by sufficiently blending in such specific ratio as regulated in the invention a hydrophobic thermoplastic resin powder or pellet with a fine pullulan powder containing powder containing a small amount of water or a plasticizer, and then melting and kneading the resulting mixture.

Further, the pullulan type resin used in the present invention is antistatic and hence does not suffer from adhesion of dust or dirt due to static electricity; does not generate poisonous gases nor high heat even when burned and hence can be treated in the same manner as in the case of combustion of wood; and spontaneously goes into a purification cycle when discarded as it is, and entirely disappears by decomposition with bacteria in soil and water, causing no problem of environmental pollution. Accordingly, a thermoplastic resin composition incorporated with the pullulan type resin of the present invention also shows the above-mentioned characteristic properties of the pullulan type resin and improved in static properties of the substrate thermoplastic resin. Furthermore, a molded article obtained from said thermoplastic resin composition has such advantages that even when subjected to combustion by use of an incinerator, the composition does not damage the incinerator by such fusion and adhesion as seen in the case where only the substrate resin is burned, and that when discarded as it is, the molded article can be destroyed in shape by dissolving-out of the pullulan type resin present in the molded article or by decomposition thereof by microorganisms.

The pullulan used in the present invention is not particularly restricted in its preparation process, and may be synthesized by any of chemical or biochemical process. At present, however, it can be separated and recovered as a tacky substance secreted in a culture liquor formed by culturing a strain of the genus Pullularia which is an incomplete microorganism. That is, a strain Pullularia pullulans is subjected to shaking culture at 24° C. for 5 days in a medium containing 10% of sucrose or glucose, 0.5% of $K_2HPO_4$, 0.1% of NaCl, 0.02% of $MgSO_4$. $7H_2O$, 0.06% of $(NH_4)_2SO_4$ and 0.04% of yeast extract, whereby pullulan can be obtained as a tacky substance secreted in the culture liquor. If necessary, purified pullulan can be obtained by subjecting the culture liquor to centrifugation to remove the cells, treating the supernatant with methanol to deposit precipitates and then separating the precipitates. Pullulan somewhat varies in physical properties depending on the kind of strain used for the preparation thereof. This, however, is not greatly concerned in the present invention with the properties of the resulting resin composition.

The molecular weight of the pullulan used in the present invention is not particularly limited, but is ordinarily 10,000 to 5,000,000, preferably 50,000 to 1,000,000.

Examples of the hydrophobic thermoplastic resin used in the present invention include polyethylenes, polypropylenes, polystyrenes, acrylonitrile-butadiene-styrene copolymers, polymethyl methacrylates, polyvinyl acetates, polyvinyl chlorides, polyvinylidene clorides, vinyl acetate-vinyl cloride copolymers, olefin-vinyl acetate copolymers (said olefin being ethylene or propylene), polycarbonates, polycetals, polysulfones, polyamides, polyesters, and mixtures thereof.

The present invention is illustrated in more detail below the reference to examples, but the invention if not limited at all to the examples.

EXAMPLE 1

A polyethylene (average molelcular weight 30,000, melting point 105°-110° C., density 0.92 g/cm³, grain size 10 -100 μ) was sufficiently mixed by means of a mixer with 20 wt %, based on the total resin weight, of a pullulan powder (molecular weight 50,000) containing 20 wt % of water. The resulting mixture was fed to a screw extruder (screw diameter 30 mm., L/D = 20) equipped at the tip with a die having a diameter of 4 mm., and was extruded to the form of a strand with a screw revolution number of 30 r.p.m. at a resin temperature of 140° C. which was then cut to grains of 3 mm. in length to prepare a granular sample. This sample was subjected to compression molding at 140° C. to obtain a sheet of 160 mm × 160 mm × 2 mm in size.

Physical properties of the thus obtained sheet were set forth in Table 1 together with those of a sheet obtained in Control Example 1.

CONTROL EXAMPLE 1

Example 1 was repeated, except that the water-containing pullulan was not used, to obtain a sheet.

Physical properties of the thus obtained sheet were set forth in Table 1 together with those of the sheet obtained in Example 1.

EXAMPLE 2

A polypropylene (average molecular weight 90,000, melting point 166° C. grain size 60 - 160 μ) was sufficiently mixed by means of a mixer with 30 wt %, based on the total resin weight, of an acetylated pullulan powder (molecular weight before acetylation =65,000) containing 15 wt % of ethylene glycol and having a substitution degree of 0.5 (complete substitution degree = 3.0). The resulting mixture was extruded at a resin temperature of 190° C. to the form of pellet by use of the same extruder as in Example 1 to prepare a pellet sample. This sample was subjected to compression molding at 190° C. to obtain a sheet of 160 mm × 160 mm × 2 mm in size.

Physical properties of the thus obtained sheet were set forth in Table 1 together with those of a sheet obtained in Control Example 2.

CONTROL EXAMPLE 2

Example 2 was repeated, except that the ethylene glycol-containing acetylated pullulan was not used, to obtain a sheet.

Physical properties of the thus obtained sheet were as set forth in Table 1 together with those of the sheet obtained in Example 2.

Table 1

| Physical Properties | Kind of starting material | Example 1 Polyethylene-pullulan | Control Example 1 Polyethylene | Example 2 Polypropylene-Acetylated pullulan | Control Example 2 Polypropylene |
|---|---|---|---|---|---|
| Tensile[1] strength (kg/cm$^2$) | Immediately after molding | 200 | 180 | 380 | 300 |
| | After swelling[2] | 160 | 180 | 310 | 320 |
| Elongation[1] (%) | Immediately after molding | 100 | 400 | 120 | 350 |
| | After swelling | 150 | 380 | 180 | 370 |
| Water absorptivity[3] | After 5 hours | 10 | 0.4 | 8 | 0.4 |
| | After 24 hours | 15 | 0.6 | 12 | 0.5 |

Notes:
[1]Tensile strength and elongation: Measured according to JIS-K 6761, using a No. 3 dumbbell.
[2]After swelling: Swelling degree after immersing the sample in water at 20° C. for 24 hours.
[3]Water absorptivity: Ratio (%) between the weight of the sample immediately after molding and the weight thereof after immersion in water at 20° C. for a definite period of time (5 or 24 hours) and after wiping-off of water drops adhered onto the surface of the sample taken out of the water.

From Table 1, it is understood that the composition of the present invention has a markedly improved water absorptivity and is high in strength.

EXAMPLE 3

A powder of pullulan having a molecular weight of 150,000 was uniformly sprayed with water by means of a sprayer to a water content of 30 wt %. This powder was fed to a screw extruder (screw diameter 30 mm., L/D = 20) equipped at the tip with a die having a diameter of 4 mm., and was extruded to the form of a strand with a screw revolution number of 30 r.p.m. at a resin temperature of 100° C. which was then cut to grains of 3 mm. in length to prepare a granular pullulan pellet. On the other hand, an ethylene-vinyl acetate copolymer emulsion (solid content 8%) was sprayed to the aforesaid pullulan pellet, while mixing the two by means of a crutcher, so that the amount of the hydrophobic resin became 5 wt % based on the total resin weight, and stirring was continued at 20° C., whereby the surface of the pullulan pellet is covered with a film of pullulan containing the hydrophobic resin. This hydrophobic synthetic resin-containing pullulan pellet was molded at a resin temperature of 130° C. by use of a screw inline type injection molding machine to obtain a plate-like sample of 60 mm × 60 mm × 3 mm in size. The thus obtained plate-like sample was immersed in water at 30° C. for 24 hours, and the swelling degree thereof was investigated to find that the weight increase of the sample was 15%.

CONTROL EXAMPLE 3

Example 3 was repeated, except that the ethylene-vinyl acetate copolymer was not used, to obtain a plate-like sample. This sample was immersed in water at 30° C. for 24 hours, whereby the sample was completely dissolved to form a homogeneous aqueous solution.

EXAMPLE 4

An acetylated pullulan powder having an acetylation substitution degree of 1.0 (complete substitution degree = 3.0) and having a molecular weight of 100,000 was sufficiently mixed with 10 parts (by weight) of ethylene glycol, 10 parts of white carbon and 0.5 part of sodium stearate. The resulting mixture was uniformly sprayed with water by use of a sprayer to a water content of 20 wt %, and then treated in the same manner as in Example 3 to prepare a granular pellet. This pellet was sprayed, while kneading at 25° C. by means of a crutcher, with a vinyl acetate-vinyl chloride copolymer emulsion (solid content 8%) incorporated with 5% of pullulan, so that the amount of the resin based on the pullulan became 15 wt %, whereby the surface of the pellet was covered with a film of pullulan containing said copolymer. From the thus treated pellet, a plate-like sample was obtained in the same manner as in Example 3. The plate-like sample was immersed in water at 30° C. for 24 hours, and the swelling degree thereof was investigated to find that the weight increase of the sample was 5 %.

CONTROL SAMPLE 4

Example 4 was repeated, except that the vinyl acetate-vinyl chloride copolymer emulsion was not used, to obtain a plate-like sample. This sample was immersed in water at 30° C. for 24 hours to investigate the swelling degree thereof to find that the weight increase of the sample was 30 %.

It is understood that the compositions obtained in Examples 3 and 4 according to the present invention have greatly been enhanced in water resistance of pullulan type resins.

What is claimed is:
1. A resin composition prepared by blending
   a hydrophilic pullulan resin having a molecular weight of 10,000 to 5,000,000 selected from the group consisting of pullulan and a pullulan resin which has been partly modified by etherification, esterification or graftcopolymerization with a vinyl compound,
   a hydrophobic thermoplastic resin selected from the group consisting of polyethylene, polypropylene, polystyrene, acrylonitrile-butadiene-styrene copolymers, polymethylmethacrylate, polyvinyl acetate, polyvinyl chloride, polyvinylidene chloride, vinyl acetate-vinyl chloride copolymer, ethylene-vinyl acetate copolymer, propylene-vinyl acetate copolymer, polycarbonates, polyacetals, polysul- fones, polyamides, and polyesters, present in an amount of 2 to 98 wt % based on the total resin and a plasticizer selected from the group consisting of water, glycerin, ethylene glycol, propylene glycol, butylene glycol, dimethyl sulfoxide, and dimethyl formamide present in an amount of 1 to 50 wt % based on the total weight of pullulan and plasticizer.

2. A resin composition according to claim 1 which has been incorporated with at least one member selected from the group consisting of calcium carbonate, calcium sulfate, magnesium carbonate, titanium oxide and clay.

3. A resin composition according to claim 1 which has been incorporated with at least one member selected from the group consisting of pigments, antioxidants, ultraviolet absorbers and antiseptics.

4. The resin composition of claim 1 wherein said hydrophilic pullulan resin is pullulan or acetylated pullulan.

* * * * *